United States Patent
Weiss et al.

(10) Patent No.: US 6,461,728 B2
(45) Date of Patent: Oct. 8, 2002

(54) GAMMA RADIATION POLYMERIZED EMULSION-BASED (METH)ACRYLATE PRESSURE SENSITIVE ADHESIVES AND METHODS OF MAKING AND USING SAME

(75) Inventors: Douglas E. Weiss, Golden Valley; Thu-Van T. Tran, Maplewood, both of MN (US); Karen J. Leisinger, Brookings, SD (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/751,143

(22) Filed: Dec. 29, 2000

(65) Prior Publication Data

US 2002/0136890 A1 Sep. 26, 2002

(51) Int. Cl.[7] .................................................. C08F 2/48
(52) U.S. Cl. ................... 428/345; 428/349; 428/355 R; 428/355 EN; 428/355 AE; 428/412; 428/421; 428/423.1; 428/426; 428/457; 428/478.2; 428/474.4; 428/480; 428/492; 428/500; 428/532; 428/537.1; 428/537.5; 428/688; 522/84; 522/182; 522/184; 522/173; 522/174; 522/178; 522/150; 524/804; 524/816; 524/819; 524/820; 524/821; 524/823; 524/827; 524/832; 524/833
(58) Field of Search .......................... 522/84, 182, 184, 522/816, 104, 107, 150, 152, 153, 157, 173, 174, 178; 428/345, 474.4, 480, 492, 500, 532, 537.1, 537.5, 688, 349, 355 R, 355 EN, 355 AC, 412, 421, 423.1, 426, 457, 478.2

(56) References Cited

U.S. PATENT DOCUMENTS

| | | | |
|---|---|---|---|
| 3,303,174 A | | 2/1967 | Lanthier |
| 4,139,437 A | | 2/1979 | Araki et al. |
| 4,144,155 A | * | 3/1979 | Araki et al. ............ 204/159.22 |
| 4,810,523 A | * | 3/1989 | Williams et al. ............... 427/36 |
| 5,416,134 A | * | 5/1995 | Skoglund ..................... 523/201 |
| 5,952,398 A | * | 9/1999 | Dietz et al. .................. 522/184 |

FOREIGN PATENT DOCUMENTS

| WO | WO 96/11992 | 4/1996 |
|---|---|---|
| WO | WO 00/04079 | 1/2000 |

OTHER PUBLICATIONS

V. T. Stannett and E. P. Stahel, "Emulsion Polymerization with High Energy Radiation," Chapter 14, *Progress in Polymer Processing Series, Radiation Processing of Polymers*, Edited by A. Sigh, and J. Silverman, Hanser Publishers, New York, NY (1992).

J. T. Tsai, E.P. Stahel and V. T. Stannett, "The Radiation–Induced Emulsion Copolymerization of Vinyl Chloride with Vinyl Acetate in an Engineering Flow System," *Journal of Applied Polymer Science*, John Wiley & Sons, Inc., vol. 23, pp. 2701–2710 (1979).

R. R. Challa, J. H. Drew, E. P. Stahel and V. Stannett, "Radiation–Induced Emulsion Polymerization of Vinyl Acetate in a Pilot Plant Reactor II. Kinetics," *Journal of Applied Polymer Science*, John Wiley & Sons, Inc., vol. 31, pp. 27–38 (1986).

R.R. Challa, J.H. Drew, V.T. Stannett and E.P. Stahel, "Radiation–Induced Emulsion Polymerization of Vinyl Acetate in a Pilot Plant Reactor I. Recycle Flow Reactor," *Journal of Applied Polymer Science*, John Wiley & Sons, Inc. vol. 30, pp. 4261–4271 (1985).

K. Ishigure, T. O'Neill, E. P. Stahel and V. Stannett, "The Radiation–Induced Polymeriztion and Copolymerization of Butadiene in Emulsion," *J. Macromol Sci.–Chem.*, Marcel Dekker, Inc., A8(2), pp. 353–372 (1974).

C. Gopinathan and T.P. Balan, "Development of Gamma Radiation Processed Pressure Sensitive Adhesives," Chem. Div., Bhabha Atomic Research Centre, Trombay, Bombay, India.

J.E. Wilson, "Emulsion Polymerization; Polyesters; Thermosetting Systems in General," Chapter 8, *Radiation Chemistry of Monomers, Polymers, and Plastics*, Marcel Dekker, Inc., New York, NY (1974).

S. Omi, V. T. Stannett and E. P. Stahel, "Mathematical Modeling of Radiation–Induced Emulsion Polymerization in a Recycle Reactor System," Dept. of Chem. Engineering, No. Carolina State Univ., Raleigh, NC.

* cited by examiner

*Primary Examiner*—James J. Seidleck
*Assistant Examiner*—Sanza L. McClendon

(57) ABSTRACT

Pressure sensitive adhesives can be formed using gamma irradiation. One embodiment is a pressure sensitive adhesive which is a polymeric reaction product formed by gamma ray irradiation of an emulsion composition. The emulsion composition includes water; (meth)acrylate monomer material; polar, free-radically polymerizable material that is copolymerizable with the (meth)acrylate monomer material; and at least one emulsifier.

25 Claims, No Drawings

GAMMA RADIATION POLYMERIZED EMULSION-BASED (METH)ACRYLATE PRESSURE SENSITIVE ADHESIVES AND METHODS OF MAKING AND USING SAME

FIELD OF THE INVENTION

This invention relates to pressure sensitive adhesives formed using gamma irradiation, methods of using the pressure sensitive adhesives, and articles containing the pressure sensitive adhesives.

BACKGROUND OF THE INVENTION

The advantage of acrylic polymers as viscoelastic bases for pressure-sensitive adhesives (PSAs) are well known. Pressure-sensitive adhesives have been used for more than half a century for a variety of marking, holding, protecting, sealing, and masking purposes. Fundamentally, PSAs require a delicate balance of viscous and elastic properties, which result in a 4-fold balance of adhesion, cohesion, stretchiness, and elasticity. In essence, PSA products have sufficient cohesiveness and elasticity so that, despite their tackiness, they can be handled with the fingers and can typically be removed from smooth surfaces without leaving a substantial amount of residue.

There are several methods presently in use for the preparation of PSAs. These methods include a variety of polymerization methods including batch, hot melt, solution, thermal emulsion, suspension, ultra-violet (UV)-initiated bulk, and UV-initiated on-web polymerization techniques. Monomer and initiator residues produced in some of these methods can prevent the attainment of desirable levels of properties (e.g., peel adhesion and shear strength) and some of these methods are relatively slow.

For example, acrylic polymer compositions can be used to make PSAs by solution polymerization. The solution polymerization methods generally use relatively large amounts of organic solvents. Polymers in solvent may be difficult to handle and transport due to the volume of the solvent and the potential release of volatile organic compounds (VOCs) into the atmosphere. Using solvents also necessitates high heat or vacuum to remove the solvent from the polymer.

SUMMARY OF THE INVENTION

Generally, the present invention relates to pressure sensitive adhesives formed using gamma irradiation. One embodiment is a pressure sensitive adhesive comprising a polymeric reaction product formed by gamma ray irradiation of an emulsion composition. The emulsion composition comprises water; (meth)acrylate monomer material; polar, free-radically polymerizable material that is copolymerizable with the (meth)acrylate monomer material; and at least one emulsifier. Yet another embodiment is like the first embodiment, as described above, wherein the polymeric reaction product is formed in the absence of any initiator selected from the group consisting of photoinitiators and thermal initiators.

Another embodiment is a pressure sensitive adhesive-forming emulsion composition comprising a polymeric reaction product formed by gamma irradiation of a composition. The composition comprising water; (meth)acrylate monomer material; polar, free-radically polymerizable material that is copolymerizable with the (meth)acrylate monomer material; and at least one emulsifier.

Yet another embodiment is a method of making a pressure sensitive adhesive, the method comprising the steps of: forming an emulsion composition comprising water, (meth)acrylate monomer material, polar, free-radically polymerizable material that is copolymerizable with the (meth)acrylate monomer material, and at least one emulsifier; and irradiating at least a portion of the emulsion composition with gamma rays to initiate polymerization of the emulsion composition. An additional embodiment is the method described above and further comprising the step of removing at least a portion of the water from the emulsion composition after irradiating at least a portion of the emulsion composition. A further embodiment is the method, as described above, wherein the step of irradiating at least a portion of the emulsion composition comprises irradiating the emulsion composition substantially uniformly.

An additional embodiment is an article comprising: a substrate; and a pressure sensitive adhesive disposed on at least one surface of the substrate, the pressure sensitive adhesive comprising a polymeric reaction product formed by gamma irradiation of an emulsion composition comprising water, (meth)acrylate monomer material, polar, free-radically polymerizable material that is copolymerizable with the (meth)acrylate monomer material, and at least one emulsifier.

Another embodiment is a pressure sensitive adhesive which is a polymeric reaction product of a composition. The composition comprises: water; (meth)acrylate monomer material; polar, free-radically polymerizable material that is copolymerizable with the (meth)acrylate monomer material; and an emulsifier. The polymeric reaction product has a shear strength of at least 5000 minutes at room temperature using a 1 kg weight and a peel adhesion of at least 45 N/dm at, at least room temperature. In another embodiment, the shear strength was at least 10,000 minutes. In yet another embodiment, the peel adhesion was at least 50 N/dm. In another embodiment, the peel adhesion was at least 50 N/dm and the shear strength was at least 10,000 minutes.

The above summary of the present invention is not intended to describe each disclosed embodiment or every implementation of the present invention. The detailed description which follows more particularly exemplifies these embodiments.

DETAILED DESCRIPTION

The present invention is believed to be applicable to pressure sensitive adhesives, methods of using the pressure sensitive adhesives, and articles containing the pressure sensitive adhesives. In particular, the present invention is directed to pressure sensitive adhesives formed by gamma irradiation, methods of using the pressure sensitive adhesives, and articles containing the pressure sensitive adhesives. While the present invention is not so limited, an appreciation of various aspects of the invention will be gained through a discussion of the examples provided below.

At least some embodiments of both the pressure sensitive adhesives of the invention and the methods of the invention to make pressure sensitive adhesives offer advantages not available currently. Water-based latex pressure sensitive adhesives of the invention can have excellent adhesive properties including a satisfactory range of both peel adhesion and shear strength performance. Some embodiments are particularly useful in applications that are adversely impacted if initiator residue is present in the adhesive. The method of making pressure sensitive adhesives can enable the use of higher solids emulsions. This can result in less need to adjust emulsion viscosity for a subsequent coating operation and lower energy cost to dry the applied adhesive coating.

Generally, the pressure sensitive adhesives of the invention are formed by gamma radiation polymerization of an emulsion containing water; (meth)acrylate monomer material; polar, free-radically copolymerizable material that is copolymerizable with the (meth)acrylate monomer material; and an emulsifier. Other components can also be added for particular application or to obtain desired properties including, for example, other copolymerizable materials, tackifying agents, crosslinking agents, free radical initiators, plasticizers, dyes, pigments, antioxidants, UV stabilizers, thickening agents, electro-conductivity agents, reflective agents, antistatic agents, inorganic materials, biocides (bactericides, fungicides), bioactive agents, pharmaceutical aids, releasable agents, cosmetic agents, rheology modifiers, and the like. The pressure sensitive adhesives can, if desired, have good peel adhesion, good shear strength, or a combination of these properties.

The terms "(meth)acrylate" or "(meth)acrylates" are used throughout this application and are meant to include both acrylate(s) and methacrylate(s).

The amounts of each component in the emulsion are typically present in a number of parts per 100 parts of the combined (meth)acrylate monomer material; polar, free-radically copolymerizable material; and any other copolymerizable material. Henceforth this basis is called the total free-radically copolymerizable material.

(Meth)Acrylate Monomer Material

Free-radically polymerizable (meth)acrylate monomer material is employed in the emulsion to make the pressure sensitive adhesives. The (meth)acrylate monomer material includes at least one type of free-radically polymerizable acrylate monomer. In some embodiments, two or more different (meth)acrylate monomers are used. (Meth)acrylate monomer materials are generally esters of acrylic acid. Suitable (meth)acrylate monomers typically have only one free-radically polymerizable group. These compounds, when homopolymerized, generally have a glass transition temperature of no more than about 10° C., preferably no more than about 0° C. and, more preferably, no more than about −10° C.

Examples of suitable (meth)acrylate monomers include acrylate esters of non-tertiary alkyl alcohols, the alkyl groups of which have from about 3 to about 13 carbon atoms. Examples of such (meth)acrylate monomers include, but are not limited to, isooctyl acrylate, 2-ethylhexyl acrylate, 4-methyl-2-pentyl acrylate, 2-methylbutyl acrylate, isoamyl acrylate, sec-butyl acrylate, n-butyl acrylate, tert-butyl acrylate, isobornyl acrylate, dodecyl acrylate, n-octyl acrylate, tridecyl acrylate, cyclohexyl acrylate, ethoxylated nonyl phenyl acrylate, methyl methacrylate, t-butyl methacrylate, iso-butyl methacrylate, butyl methacrylate, cyclohexyl methyl acrylate, hexyl methacrylate, iso decyl methacrylate, and hexyl ethyl methacrylate.

Polar, Free-radically Copolymerizable Material

The polar, free-radically copolymerizable material useful in the emulsions to form pressure sensitive adhesives can include monomers, oligomers, and macromonomers. These materials generally have only one functional group which readily copolymerizes with the (meth)acrylate monomer material. The polar, free-radically copolymerizable material can be formed using a single compound or two or more compounds, as desired.

The polar, free-radically copolymerizable material generally provides hydrogen bonding to affect the properties of the pressure sensitive adhesive, such as, for example, increasing the cohesive strength of the resulting polymer. The polar, free-radically copolymerizable material is typically selected from the group of materials including ethylenically unsaturated carboxylic, sulfonic, and phosphonic acids (and their salts); ethylenically unsaturated anhydrides; ethylenically unsaturated amines and amides; N-vinyl lactams; ethylenically unsaturated alcohols; ethylenically unsaturated nitriles; and ethylenically unsaturated polyethers and polyesters.

Suitable polar, free-radically copolymerizable materials include, but are not limited to, acrylic acid, methacrylic acid, itaconic acid, crotonic acid, maleic acid, fumaric acid, vinyl phosphonic acid, 2-acrylamido-2-methylpropylsulfonic acid, maleic anhydride, N,N-dimethylaminoethylacrylate, N,N-dimethylaminoethylmethacrylate, N-vinyl pyrrolidone, N-vinyl caprolactam, acrylamide, t-butyl acrylamide, N,N-dimethyl amino ethyl acrylamide, N-octyl acrylamide and other N-substituted acrylamides, N,N-dimethylacrylamide and other N,N-disubstituted acrylamides, 2-hydroxyethyl acrylate, 2-hydroxyethyl methacrylate, 3-hydroxypropyl acrylate, 3-hydroxypropyl methacrylates, acrylonitrile, methacrylonitrile, carbowax acrylate, methoxy-ethoxy-ethyl acrylate, mixtures thereof, and the like. Preferred monomers include acrylic acid, methacrylic acid, N-vinyl pyrrolidone, hydroxyethyl acrylate, acrylamide, and mixtures thereof Generally, the (meth)acrylate monomer material is provided in the emulsion in an amount that is sufficiently low to result in a stable emulsion and sufficiently high to improve the shear properties of the pressure sensitive adhesive. Typically, the (meth)acrylate monomer is provided in an amount ranging from about 84 to 98 parts by weight and the polar, free-radically copolymerizable material is provided in an amount ranging from about 2 to 6 parts by weight.

The (meth)acrylate monomer material or polar, free-radically copolymerizable material can contain two or more different components (e.g., the (meth)acrylate component may comprise two or more different (meth)acrylates that can be combined in any ratio) as long as the glass transition temperature of the total polymerizable material is no more than about 10° C.

Other Copolymerizable Materials

In addition to the (meth)acrylate monomer material and the polar, free-radically copolymerizable material, the emulsion composition may contain other copolymerizable materials. Typically, these materials are used in place of some of the (meth)acrylate monomer material and are copolymerizable with the (meth)acrylate monomer material.

Vinyl ester monomers are generally suitable for use as a copolymerizable material in the emulsions (to enhance cohesive strength). Examples of suitable vinyl ester monomers include unsaturated vinyl esters of linear or branched carboxylic acids having 1 to 12 carbon atoms. Such vinyl ester monomers include, but are not limited to, vinyl 2-ethylhexanoate, vinyl caprate, vinyl laurate, vinyl pelargonate, vinyl hexanoate, vinyl propionate, vinyl decanoate, and vinyl octanoate. Preferred vinyl ester monomers include vinyl acetate, vinyl laurate, vinyl caprate, vinyl-2-ethylhexanoate, styrene and mixtures thereof.

Suitable copolymerizable oligomers and macromonomers include acrylate-terminated poly(methyl methacrylate), methacrylate-terminated poly(methyl methacrylate), p-vinyl benzyl-terminated poly(methyl methacrylate), acrylate-terminated poly(styrene), methacrylate terminated poly(styrene), acrylate-terminated poly(ethylene oxide), methacrylate-terminated poly(ethylene oxide), acrylate-terminated poly(ethylene glycol), methacrylate-terminated poly(ethylene glycol), methoxy poly(ethylene glycol) methacrylate, butoxy poly(ethylene glycol) methacrylate, p-vinyl benzyl-terminated poly(ethylene oxide), p-vinyl benzyl-terminated(ethylene glycol), and mixtures thereof One class of useful copolymerizable oligomers and macromonomers are those having a polymeric moiety with a glass transition temperature, $T_g$, greater than 20° C. as described in U.S. Pat. No. 4,554,324 (Husman et al.), incorporated herein by reference. Such copolymerizable oligomers and macromonomers include, for example, ethylmethacrylate-terminated polystyrene (having a molecular weight of approximately 13,000) available as CHEMLINK 4500 from Sartomer Co., West Chester, Pa. Other useful polymerizable oligomers and macromonomers include acrylate-terminated poly(ethylene) glycols, such as acrylate-terminated poly(ethylene oxide) (having a molecular weight of 550), available as AM-90G from Shin-Nakmura Inc., Japan.

Other copolymerizable materials that may be included in the emulsion or the pressure sensitive adhesive are prepolymerized materials. These materials may be in a syrup. The prepolymerized material may be a (meth)acrylate monomer.

The other copolymerizable material described in this section typically replaces part of the (meth)acrylate monomer material. The other copolymerizable material may be used in an amount that is sufficient to modify the pressure sensitive adhesive to achieve a specific application. These materials could comprise up to 50% of the emulsion or pressure sensitive adhesive.

Emulsifiers

Polymerization via emulsion techniques generally includes the presence of at least one emulsifier, such as a surfactant or a polymeric suspending agent. These types of materials allow for the formation and stabilization of the emulsion. Without an emulsifier, droplets that later become latex particles typically cannot be formed.

Surfactants

Useful surfactants for the present invention include non-ionic surfactants, anionic surfactants, cationic surfactants, and mixtures thereof Optionally, the surfactant is copolymerizable with the (meth)acrylate monomer material and the polar, free-radically copolymerizable material.

Suitable nonionic surfactants include, but are not limited to, those surfactants with molecular structures that can be formed as a condensation product of a hydrophobic aliphatic or alkyl aromatic compound with a hydrophilic alkylene oxide, such as ethylene oxide. The Hydrophilic-Lipophilic Balance (HLB) of typical nonionic surfactants is about 10 or greater and usually ranges from about 15 to about 20. The HLB of a surfactant is an expression of the balance of the size and strength of the hydrophilic (water-loving or polar) groups and the lipophilic or hydrophobic (oil-loving or non-polar) groups of the surfactant and is generally indicated by the manufacturer of the surfactant.

Commercial examples of suitable nonionic surfactants include, but are not limited to, nonylphenoxy and octylphenoxy poly(ethyleneoxy) ethanols available, for example, as the IGEPAL CA and CO series, respectively from Rhone-Poulenc, Inc., Cranberry, N.J.; C11 to C15 secondary-alcohol ethoxylates available, for example, as the TERGITOL 15-S series, including 15-S-7, 15-S-9, 15-S-12, from Union Carbide Chemicals and Plastics Co., Gary, Ind.; polyoxyethylene sorbitan fatty acid esters available, for example, as the TWEEN series of surfactants from ICI Chemicals, Wilmington, Del.; polyethylene oxide(25) oleyl ether available, for example, as SIPONIC Y-500-70 from Americal Alcolac Chemical Co., Baltimore, Md.; alkylaryl polyether alcohols available, for example, as the TRITON X series, including X-100, X-165, X-305, and X-405, from Union Carbide Chemicals and Plastics Co., Gary, Ind.

Useful anionic surfactants include, but are not limited to, those with molecular structures having (1) at least one hydrophobic moiety, such as, for example, $C_6$ to $C_{12}$ alkyl, alkylaryl, and alkenyl groups and (2) at least one anionic group, such as, for example, sulfate, sulfonate, phosphate, polyoxyethylene sulfate, polyoxyethylene sulfonate, polyoxyethylene phosphate, and the like, or the salts of such anionic groups, including, for example, the alkali metal salts, ammonium salts, tertiary amino salts, and the like.

Representative commercial examples of suitable anionic surfactants include, for example, sodium lauryl sulfate, available as TEXAPON L-100 from Henkel Inc., Wilmington, Del., or as POLYSTEP B-3 from Stepan Chemical Co, Northfield, Ill.; sodium lauryl ether sulfate, available as POLYSTEP B-12 from Stepan Chemical Co., Northfield, Ill.; ammonium lauryl sulfate, available as STANDAPOL A from Henkel Inc., Wilmington, Del.; and sodium dodecyl benzene sulfonate, available as SIPONATE DS-10 from Rhone-Poulenc, Inc., Cranberry, N.J.

Other suitable anionic surfactants include, but are not limited to, ethylenically-unsaturated copolymerizable surfactants of the formula: R—O—(R'O)$_m$—(CH$_2$CH$_2$O)$_{n-1}$—CH$_2$CH$_2$X. R is selected from the group consisting of $C_{12}$ to $C_{18}$ alkenyl, acrylyl, acrylyl alkyl, methacrylyl, methacrylyl alkyl, vinylphenyl and vinylphenylene. R'O is a bivalent alkyleneoxy group derived from an epoxy compound having more than two carbon atoms such as, for example, propylene oxide or butylene oxide. In addition, m represents an integer of about 5 to about 100 and n represents an integer of about 5 to about 100. The ratio of m to n generally ranges from about 20:1 to about 1:20. The ratio of m to n will typically influence the HLB of the polymerizable surfactant. The HLB for suitable anionic copolymerizable surfactants, exclusive of the X-group, ranges from about 8 to about 18. X is an anionic group such as, for example, sulfonate, sulfate, and phosphate. In addition, the alkali metal salts, ammonium salts, and tertiary amino salts of these compounds can be used.

Examples of copolymerizable anionic surfactants include alkylene polyalkoxy sulfate available as MAZON SAM 211 from PPG Industries, Inc., Gurnee, Ill. and o-propylene-p-alkyl phenolethoxy ammonium sulfate available as HS-10 from DKS International, Inc., Japan.

Suitable cationic surfactants include, but are not limited to, quaternary ammonium salts having at least one higher molecular weight substituent and at least two or three lower molecular weight substituents linked to a common nitrogen atom. The counter ion to the ammonium cation is, for example, a halide (bromide, chloride, iodide, or fluoride), acetate, nitrite, or lower alkosulfate (e.g., methosulfate). The higher molecular weight substituent(s) of the ammonium cation are, for example, alkyl group(s), containing about 10 to about 20 carbon atoms. The lower molecular weight substituents of the ammonium cation are, for example, alkyl groups of about 1 to about 4 carbon atoms, such as methyl or ethyl. These alkyl groups are optionally substituted with hydroxy moieties. Optionally, one or more of the substituents of the ammonium cation can include an aryl moiety or be replaced by an aryl, such as benzyl or phenyl. Also among the possible lower molecular weight substituents are lower alkyls of about 1 to about 4 carbon atoms, such as methyl and ethyl, substituted by lower polyalkoxy moieties such as polyoxyethylene moieties, bearing a hydroxyl end group. These moieties fall within the general formula—R (CH$_2$CH$_2$O)$_{(n-1)}$—CH$_2$CH$_2$OH where —R is the $C_1$ to $C_4$ alkyl group bonded to the nitrogen, and n represents an integer of about 1 to about 15. Alternatively, one or two of such lower polyalkoxy moieties having terminal hydroxyls can be directly bonded to the nitrogen.

Examples of suitable quaternary ammonium halide surfactants include, but are not limited to, trimethyl alkyl benzyl ammonium chloride, available as VARIQUAT 50MC from Witco Corp., Greenwich, Conn.; methylbis(2-hydroxyethyl)co-ammonium chloride or oleyl-ammonium chloride, available as ETHOQUAD C/12 and ETHOQUAD O/12, respectively, from Akzo Chemical Inc., Matawan, N.J.; and methyl polyoxyethylene octadecyl ammonium chloride, available as ETHOQUAD 18/25 from Akzo Chemical Inc., Matawan, N.J.

Generally, the surfactant is provided in the emulsion in an amount ranging from about 0.05 to about 8 parts by weight for 100 parts by weight of the total free-radically copolymerizable material. Typically, the surfactant is provided in an amount ranging from about 0.1 to about 3 parts by weight.

Polymeric Suspending Agents

Polymeric suspending agents can also be used in the emulsion, either alone or in combination with one or more surfactants, to stabilize the emulsion. Suitable polymeric suspending agents are those conventionally used in emulsion polymerization processes and include, for example, water-soluble organic suspending agents such as, for example, polyacrylic acid and polyvinyl alcohol.

Generally, the polymeric suspending agent is provided in the emulsion in an amount ranging from about 0.05 to about 8 parts by weight for 100 parts by weight of the total free-radically copolymerizable material. Typically, the polymeric suspending agent is provided in an amount ranging from about 0.1 to about 3 parts by weight.

Crosslinking Agents

Crosslinking agents can optionally be added to the emulsion composition to influence the cohesive strength and other properties of the pressure sensitive adhesive. For example, a desired additive may have been added to the emulsion that results in a reduction in the emulsion's cohesive strength, and the crosslinking agents may be necessary to enhance the cohesive strength. The crosslinking agents are copolymerizable. Examples of copolymerizable crosslinking agents include, but are not limited to, alkyl diacrylates, alkyl triacrylates, and alkyl tetraacrylates. Examples of specific crosslinking agents-include 1,2-ethylene glycol diacrylate, 1,4-butanediol diacrylate, 1,6-hexanediol diacrylate, 1,8-octanediol diacrylate, 1,12-dodecanediol diacrylate, trimethylol propane triacrylate, pentaerythritol tetraacrylate, and mixtures thereof.

Other suitable multifunctional crosslinking agents include oligomeric and polymeric multifunctional acrylates and methacrylates. Specific examples of these materials include poly(ethylene oxide) diacrylate, poly(ethylene oxide) dimethylacrylate, and difunctional urethane acrylates, such as, for example, EBECRYL 270 and EBECRYL 230 (1500 weight average molecular weight and 5000 weight average molecular weight acrylated urethanes, respectively) both available from Radcure Specialties, Atlanta, Ga.

Crosslinking agents, when used, are generally provided in the emulsion in an amount ranging from about 0.005 to about 5 parts by weight for 100 parts by weight of the total free-radically copolymerizable material. Typically, the crosslinking agents are provided in an amount ranging from about 0.01 to about 2 parts by weight.

Chain Transfer Agents

The emulsion composition can optionally include a chain transfer agent. Chain transfer agents can be added to control the molecular weight of the resulting pressure sensitive adhesive. The chain transfer agent acts to terminate the polymerization process, causing the polymer to have a shorter chain length, and thus a lower molecular weight than it might otherwise have. In general, the more chain transfer agent added, the lower the average molecular weight of the resulting polymer. Examples of suitable chain transfer agents include, but are not limited to, organic solvents, carbon tetrabromide, alcohols, mercaptans, and mixtures thereof Specific suitable chain transfer agents include n-dodecyl mercaptan, isooctylthioglycolate, pentaerythritol tetrathioglycolate, and carbon tetrabromide.

Chain transfer agents, when used, are provided in the emulsion in an amount ranging from about 0.01 to about 5 parts by weight for 100 parts by weight of the total free-radically copolymerizable material. Typically, the chain transfer agent is provided in an amount ranging from about 0.05 to about 2 parts by weight.

In some embodiments, the combination of relatively low levels of crosslinking agent and chain transfer agent can result in high peel adhesion and shear properties. In these embodiments, the amount of crosslinking agent can be, for example, 0.01 to 0.1 parts by weight and the amount of chain transfer agent can be for example, 0.01 to 0.1 parts by weight.

Thickeners

Optionally, thickeners can be added to an emulsion composition, preferably after polymerization, to influence the viscosity or other properties of the resulting pressure sensitive adhesive. Adding a polymer or copolymer thickener, a polysaccharide thickener, or an inorganic thickener to the emulsion can alter the viscosity of the polymerized emulsion. Typically, increasing the viscosity of the emulsion can make it easier to coat the emulsion onto a substrate.

A polysaccharide or inorganic thickener can be used to modify the emulsion's coating viscosity or when thicker pressure-sensitive adhesive layers are desired. Examples of suitable polysaccharide thickeners include starches such as corn starch. Suitable inorganic thickening agents include, for example, silicas such as hydrophilic silica available under the trade name CAB-O-SIL M5 from Cabot Corporation, Tuscola, Ill. and colloidal silicas available under the trade names NALCO 2327 or NALCO 1034A from Nalco Chemical Co., Naperville, Ill.

When used, the polysaccharide or inorganic thickener is provided in the emulsion in an amount ranging from about 1 to about 10 parts by weight for 100 parts by weight of the total free-radically copolymerizable material. Typically, the polysaccharide or inorganic thickener is provided in an amount ranging from about 1 to about 3 parts by weight.

Tackifying Agents

Optionally, tackifying agents can be added to the emulsion composition to alter peel and shear properties of the resulting pressure sensitive adhesive. Useful tackifying agents include, for example, hydrogenated hydrocarbon resins, phenol modified terpenes, poly(t-butyl styrene), synthetic hydrocarbon resins, rosin esters, vinyl cyclohexane, and the like. Specific examples of such tackifying agents include synthetic and natural resins available as REGALREZ 1085, REGALREZ 1094, REGALREZ 6108, PICCOLYTE S-115, and FORAL 85, all from Hercules Chemical Co., Wilmington, Del.; WINGTACK PLUS, from Goodyear Tire and Rubber Company, Akron, Ohio; ESCOREZ 1310, from Exxon Chemical Co., Houston, Tex.; and ARKON P-90, from Arakawa Chemical Industries, Osaka, Japan.

When used, the tackifying agent is provided in the emulsion in an amount ranging from about 0.5 to about 30 parts by weight for 100 parts by weight of the total free-radically copolymerizable material. Typically, the tackifying agent is provided in an amount ranging from about 1 to about 15 parts by weight.

Initiators

One of the major advantages of the present invention is that chemical free radical initiators are not needed to initiate the polymerization process. Subjecting the water phase of the emulsion to gamma rays generates hydrogen and hydroxyl free radicals (on the order of 1 hydrogen radical and 3 hydroxyl radical per 100 eV of absorbed energy). These free radicals are highly reactive and provide free radical initiation without the need of chemical initiators. Additionally, gamma rays cause monomer decomposition in the oil droplets, which also generates free radicals that initiate polymerization in the oil droplets.

If desired, however, chemical initiators (e.g., thermal initiators or photoinitiators) can be used, for example, for pre- or post-irradiation polymerization or crosslinking. Adding initiators can change the properties of the resulting pressure sensitive adhesive. For example, initiators may increase shear strength and decrease peel adhesion or vice versa. In addition, initiators may decrease the optical clarity of the polymer.

Other Additives

The emulsion of the invention can optionally contain one or more conventional additives including plasticizers, dyes, pigments, fillers, antioxidants, antiozonants, UV stabilizers, electro-conductivity agents, reflective agents, antistatic agents, inorganic materials, biocides (bactericides, fungicides), bioactive agents, pharmaceutical aids, releasable agents, cosmetic agents, rheology modifiers, and the like.

Solids Contents

The emulsions described herein can be made with a higher content of solids (and in particular, the polymerizable material,) than is generally possible when using other batch emulsion methods (which typically have a solid content of about 20%). Advantageously, a high solids content typically provides a viscosity that makes it easy to coat the emulsion and to control the coating thickness. The high solids content can also reduce any heat or time needed to obtain a dry polymerized coating because there is a smaller amount of water used to make the emulsion. A lower solids emulsion can still be used but will typically have a lower viscosity unless a thickener is present to increase the viscosity of the polymerized emulsion.

At the relatively low dose rates typically used in the experiments described herein, there was generally no coagulation, even at 40% to 50% solids. Higher dose rates generally caused emulsions with high solids contents to coagulate. The ability to agitate or to circulate the emulsion may reduce the tendency to coagulate.

Substrates

The emulsions, after polymerization by gamma irradiation, are easily coated onto substrates, e.g., backing materials, by conventional coating techniques. A wide variety of substrates can be used. The substrates can be any materials conventionally used as a tape backing, optical film, or any other flexible material. Examples of suitable substrates include substrates made of paper or wood, plastic films made using polymers such as, for example, polyethylene, polypropylene, polyurethane, polyvinyl chloride, polyester (e.g., polyethylene terephthalate), polystyrene, polycarbonates, polyphenylene oxides, polyimides, polyvinyl fluoride, polyvinylidene fluoride, polytetrafluoroethylene, cellulose acetate, and ethyl cellulose.

Substrates can also be made of fabric such as woven fabric formed from threads of synthetic or natural materials such as cotton, nylon, rayon, glass, ceramic materials, and the like, or nonwoven fabric such as air-laid webs of natural or synthetic fibers, or blends of these. Materials normally used as release liners can also be used. These include silicone-coated polymer film or paper and polyethylene-coated paper. The substrates can also be formed of metal and other inorganic materials such as, for example, aluminum foil, copper foil, tin foil, steel panels, metalized polymer films, metalized plastics, glass, and ceramic sheet materials. The substrates can be flexible or rigid, and can be occlusive or non-occlusive. The substrates can take the form of any article conventionally known to be used with pressure sensitive adhesive compositions including articles such as, for example, labels, tapes, signs, covers, marking indicia, and the like.

Preparation of the Emulsion

A variety of known methods are available for making the emulsions using the components described above. An example of one method includes mixing deionized water with the emulsifier in a homogenizing mixer. Examples of suitable mixers include the Greerco homogenizer (Model #12, Greerco Corp., Hudson, N.H. and the OMNI homogenizer (Model #17105, OMNI Corp. International, Waterbury, Conn.). The surfactant and water mixture can be initially agitated at a medium speed setting to dissolve the surfactant in the deionized water and then mixed at a high speed setting to form an emulsion.

Once the emulsifier is dissolved in the water, the other components of the emulsion (which have typically been premixed) are added to the emulsion. The emulsion is mixed under high shear conditions until small droplets are formed.

Gamma Irradiation of the Emulsion

The emulsion is irradiated with gamma rays to initiate polymerization by free radical generation in response to the gamma rays impacting the emulsion. In particular, the gamma rays generate free radicals throughout the emulsion. This was done by way of, for example, Compton electrons that result from the elastic collision between a photon and a loosely bound or unbound electron. In this process, the photon energy is reduced and the electron is set in motion.

In one embodiment, the entire emulsion is positioned in proximity to a gamma ray source. Preferably the emulsion is irradiated in a substantially uniform manner by either repositioning the source or material, or agitating the material during irradiation. In another embodiment, only a portion of the emulsion is brought into proximity to the gamma ray source to generate free radicals. This portion can be returned to and mixed with the remainder of the emulsion to initiate polymerization in the remainder. In yet another embodiment, the emulsion is pumped around the gamma ray source (for example, through a tube looped around the gamma source) so that at least a portion of the emulsion is in proximity to the gamma rays at each point in time.

In general, the dose rate in a gamma irradiator is determined by the source strength at the time of irradiation and the distance from the source to the target (e.g., emulsion). Generally, suitable gamma ray sources emit gamma rays having energies of 400 keV or greater. Typically, suitable gamma ray sources emit gamma rays having energies in the range of 500 keV to 5 MeV. Examples of suitable gamma ray sources include cobalt-60 isotope (which emits photons with energies of approximately 1.17 and 1.33 MeV in nearly equal proportions) and cesium-137 isotope (which emits photons with energies of approximately 0.662 MeV). The distance from the source can be fixed or made variable by changing the position of the target or the source. The flux of gamma rays emitted from the source generally decays with (1) the square of the distance from the source and (2) duration of time as governed by the half-life of the isotope.

Once a dose rate has been established, the absorbed dose is accumulated over a period of time. During this period of time, the dose rate may vary if the source or target is in motion. For any given piece of equipment and irradiation sample location, the dosage delivered can be measured in accordance with ASTM E-1702 entitled "Practice for Dosimetry in a Gamma Irradiation Facility for Radiation Processing". Specifically, all of the dosimetry reported in the examples was done per ASTM E-1275 entitled "Practice for Use of a Radiochromic Film Dosimetry System" using Far West Technologies (Goleta, Calif.) thin film dosimeters.

Dose is the total amount of energy absorbed per mass unit. Dose is commonly expressed in Megarads (Mrads) or kiloGrays (kGy). A Mrad is 10 kiloGrays. A Gray is defined as the amount of radiation required to supply 1 joule of energy per kilogram of mass. The total dose received by the emulsion depends on a number of parameters including source activity, residence time (i.e., the total time the sample is irradiated), the distance from the source, and attenuation by the intervening cross-section of materials between the source and emulsion. Dose is typically regulated by controlling residence time, distance to the source, or both.

The total dose received by the emulsion can affect the extent of polymerization and crosslinking. Generally, it is desirable to convert at least 80 wt. % of the (meth)acrylate monomer material to polymer. Preferably, at least 90 wt. % or 95 wt. % of the (meth)acrylate monomer material is converted to polymer. The dose needed for polymerization depends on a variety of factors including, for example, the materials used in the emulsion, the desired properties, the presence/absence and amount of crosslinking agent, the presence/absence and amount of chain transfer agent, the presence and amount of free radical inhibitors or free radical scavengers present, such as dissolved oxygen, and the desired properties. Generally, it was found that doses in the range of about 0.02 to 40 kGy were suitable. In particular, it was found that doses of about 0.5 to 5 kGy at the dose rate used in the examples were sufficient to obtain pressure sensitive adhesives with a range of peel adhesion and shear properties that were suitable for a wide range of applications. Total dose requirement for any given composition will vary as a function of the dose rate. As the dose rate increased, the dose requirement increased to overcome an increased level of radical termination that typically takes place.

Higher dose rates typically result in formation of low molecular weight material and highly-crosslinked polymers. Excessive crosslinking and/or the presence of low molecular weight material not incorporated in the gel may cause a pressure sensitive adhesive to have low shear and peel adhesion properties. Thus, a dose rate can be selected based on desired properties for a specified composition. The dose rate is typically in the range of 0.0001 kGy/sec and 0.01 kGy/sec.

Generally, the emulsion is purged (e.g., for two minutes or more) of air using nitrogen or another inert gas because oxygen inhibits free-radical polymerization. This purging can facilitate polymerization and high conversion in a desired period of time. However, purging is not necessary when the containers that hold the emulsion contain only a small amount of trapped air. A higher dose rate or a longer exposure time would be needed to achieve a similar degree of polymerization absent purging if a significant amount of oxygen were present.

The formation of pressure sensitive adhesives using gamma irradiation of an emulsion appears to be relatively temperature independent as long as the emulsion remains stable during polymerization.

Coating Techniques

Techniques for coating the polymerized emulsions on the substrate include any method suitable for solution coating on a substrate such as, for example, spray coating, curtain coating, casting, calendaring, knife coating, doctor blade coating, roller coating, reverse roller coating, extrusion coating, and die coating. Any desired thickness can be selected (e.g., a thickness of 25 to 50 $\mu$m). Generally, the coated and polymerized emulsion is allowed to dry to evaporate the water. This can be done by air drying or drying in an oven.

This invention is further illustrated by the following examples which are not intended to limit the scope of the invention.

EXAMPLES

The following tests have been used to evaluate polymerized compositions of the Examples:

CONVERSION PERCENTAGE

This test measures the amount of monomer converted into polymer. The test was performed on samples after they were subjected to gamma irradiation. The sample was placed in a preweighed aluminum pan ($m_{pan}$). The sample was weighed before ($m_{wet}$) and after ($m_{dry}$) being placed in an oven for 2 hours at 100° C. The conversion percentage (CP) was computed as follows:

$$CP=(m_{dry}-m_{pan})(100)/(m_{wet}-m_{pan})(S)$$

where S is the calculated solids percentage of the total polymerizable material.

Reported values are generally an average of 2 samples. Estimated error in the measurement is ±1.0%.

GEL PERCENTAGE

This test measures the amount of crosslinking obtained by the polymerization. The gel percentage (GP) was determined in the following manner. Approximately 0.5 g of dried sample was weighed to give $m_{original}$ and then submerged in about 25 ml of heptane in a sealed glass jar. The jar was shaken for 24 hours by a shaker, Model 6010 available from Eberbach Scientific Instruments and Apparatus. The contents of the jar were then filtered through a No. 4 size filter paper (12.5 cm circle), available from Whatman International Ltd., Maidstone, England, to separate any crosslinked polymer, i.e., the insoluble portion. The extracted portion was collected in a preweighed glass jar, air-dried, weighed and recorded to provide $m_{extract}$. The percent extractable and the gel percentage were calculated by the following formulas:

% extractable=$m_{extract}$×100/$m_{original}$

GP=100−% extractable.

The results are generally an average of two samples and are reported to the nearest whole number.

POLYMERIZED COATING THICKNESS

The measured thickness of the polymerized coating was determined using a digital micrometer (Type ID-110E, Mitutoyu Mfg. Co., Ltd., Japan). The micrometer measured the thickness of both the dried, coated substrate sample and the uncoated substrate from the same roll of substrate. The value for the thickness of the uncoated substrate is generally an average of six measurements. The measured coating thickness was then determined by subtracting the thickness of the substrate from the thickness of the coated substrate.

PEEL ADHESION

Pressure-sensitive adhesive tape samples were cut about 1.27 cm wide and about 12 cm long. These tape samples were tested for 180° peel adhesion to a clean glass plate. Prior to being cut, the samples were placed for 20 to 30 minutes in an oven set at 65° C. and then allowed to rest overnight in a controlled environment in which the temperature was maintained at 22° C. and relative humidity maintained at 50%. The samples were adhered to the glass test surfaces by rolling the tape with one pass of a 2.1 kg (4.5 lb) hard rubber roller moving at a speed of about 230 cm/min (90 in/min) leaving a free end.

The free end was attached to the adhesion scale of an Analogic Measurometer II Model 3M90 slip/peel tester, available from Instrumentors, Inc., which was set to record average peel values. The free end of the tape was doubled back so the tape was nearly touching itself to cause the angle of removal to be 180°. The tape samples were pulled in this 180° geometry at a 230 cm/min (90 in/min) peel rate. Peel Adhesion values were measured in oz/0.5 in and converted to N/dm. Reported values are generally from a single measurement.

Any adhesive failure occurred at the interface of the adhesive and the test surface unless noted otherwise. Shocky, irregular peel is indicated by "sh". In some instances, cohesive failure of the adhesive resulted in some adhesive from the sample transferring to the test surface and this is indicated by a "t" in the tables.

SHEAR STRENGTH

Shear strength was measured on pressure-sensitive adhesive tape samples at room temperature (RT) and at elevated temperature. The pressure-sensitive adhesive tape was placed for 20 minutes in an oven set at 65° C. and then allowed to rest overnight in a controlled environment in which the temperature was maintained at 22° C. and relative humidity maintained at 50%. A section of tape was cut and adhered to a stainless steel panel by hand with a 2.1 kg (4.5 lb) roller using 6 passes. A 12.7 mm×12.7 mm (0.5 in×0.5 in) portion of tape was in firm contact with the steel panel and an additional end portion of the tape was free. A 1000 gram weight was adhered to the free end portion of the tape. The RT samples were placed on a rack in a room at 25° C. and 50% relative humidity. The elevated temperature samples were placed in an oven set at 70° C. and aged 10 minutes before the weight was attached. In both cases, the steel test panel was tilted 2° from vertical (creating a 178° angle with the tape) to insure against any peel forces acting on the sample. The amount of time for the tape to separate from the test panel was recorded. The test was typically stopped at 10,000 minutes unless otherwise noted. Reported values are a measurement from a single sample, except a second sample was usually tested if the first failed in less than 10,000 minutes. Mode of failure was adhesive unless otherwise noted. Adhesive failure resulted in a split of the adhesive with a residue on the steel plate. If so much adhesive remained on the steel plate that the sample more or less separated or "split" into two layers, it is noted as "sp." If some adhesive residue remained on the steel plate it is noted as "r".

The following terminology and trade names are used in the Examples:

| Type | Trade Name | Source |
|---|---|---|
| iso-octyl acrylate | | Sartomer Chemical Co., West Chester, Pennsylvania |
| n-butyl acrylate | | Aldrich Chemical Co., Milwaukee, Wisconsin |
| 2-ethyl hexyl methyl acrylate | | Aldrich Chemical Co., Milwaukee, Wisconsin |
| n-octyl acrylate | | Aldrich Chemical Co., Milwaukee, Wisconsin |
| acrylic acid | | Aldrich Chemical Co., |
| sodium dodecyl benzene sulfonate (anionic) | SIPONATE DS-10 | Rhone-Poulenc, Inc., Cranberry, New Jersey |
| ammonium lauryl sulfate | STANDAPOL A | Henkel Corp., Cosphe, Canada |
| o-propylene-p-alkyl phenolpolyethoxy ammonium sulfate (polymerizable) | HS-10 | DKS, International, Inc., Japan |
| alkylene polyalkoxy sulfate (polymerizable) | MAZON SAM-211-80 | PPG Industries, Gurnee, Illinois |
| trimethylopropane triacrylate | | Radcure Specialties, Inc., Chicago, Illinois |
| pentaerythritol tetraacrylate | | ARCO Specialty Chemicals Co., New Town Square, Pennsylvania |
| n-dodecyl mercaptan | | Aldrich Chemical Co., Milwaukee, Wisconsin |
| rosin glycerol ester | FORAL 85 | Hercules Chemical Co., Wilmington, Delaware |
| modified aliphatic hydrocarbon resin | WINGTACK PLUS | Goodyear Tire and Rubber Co., Akron, Ohio |
| saturated hydrocarbon resin | ARKON P-90 | Hercules Chemical Co., Wilmington, Delaware |
| polyterpene resin | PICCOLYTE S-115 | Hercules Chemical Co., Wilmington, Delaware |
| synthetic hydrocarbon resin | ESCOREZ 1310 | Exxon Chemical Co., Houston, Texas |
| polyethylene terephthalate film chemically treated an aminated polybutadiene priming agent, 38 micrometers thick | | 3M Company, St. Paul, Minnesota |

Throughout the Examples, the Specification and the Claims, all parts, percentages, and ratios are by weight unless otherwise indicated. Parts of any emulsion components are based on 100 parts by weight of the (meth)acrylate monomer material and the polar, free-radically copolymerizable material. Most measurements were recorded in English units and converted to SI units.

General Experimental Method

Except as indicated in the individual Examples, the following method was used. A (meth)acrylate emulsion was made by adding 0.53 parts of emulsifier, SIPONIC DS-10, to 75 parts of deionized water in a beaker. The contents were mixed with a homogenizing mixer (available as model 17105 from Omni Corporation International, Waterbury, Conn.) until the emulsifier dissolved. Then 25 parts of a free-radically polymerizable premix containing 96 wt % (meth)acrylate monomer material, iso-octyl acrylate, and 4 wt % polar free-radically copolymerizable material, acrylic acid, was added to the beaker and homogenized to form a polymerizable emulsion. The emulsion had a weight percent solids of total free-radically polymerizable material of about 25% and contained a uniform size distribution of (meth) acrylate-based oil droplets typically having a diameter 1.0 μm or less as observed using an optical microscope.

The emulsion was poured into 4 oz. glass jars and then purged with nitrogen for about one minute before the jars were sealed and put into 130 mm (5 in) diameter steel cans.

The cans were placed in a chamber on a shelf that surrounded a gamma irradiation source (the whole chamber is available as an IR-100 tote box gamma irradiation facility built by MDS Nordion Inc., Kanata, Ontario). The facility was generally operated at a source strength of about 1.8 MegaCurie (MCi). The source included a rack of "pencils" containing cobalt-60 isotope located at the center of a source-pass mechanism. The source-pass mechanism was a conveyor-like mechanism that allowed multiple totes to pass continuously in a shuffle/dwell stepwise manner from one position to another position in series through the irradiation chamber to receive a specified dose of radiation. Within the irradiation chamber, but outside of the source-pass mechanism, was a track for a single small tote to pass through the chamber to a position where it received a reasonably constant dose rate for a specified period of time. The cans were placed in this small tote, moved to the position for irradiation, irradiated for half of the allotted time, removed and rotated 180 degrees, returned to the position and irradiated for the second half of the allotted time and removed.

Typically, the temperature of the contents of the glass jar was allowed to rise with the adiabatic heat of reaction. The chamber temperature was between 38 and 43° C. The actual peak temperature of the emulsion during the exothermic polymerization was as high as 60° C.

In some Examples, the emulsions were kept cool using ice. When ice was used as a heat sink, pre-chilled jars of emulsion were packed in cans of ice.

The polymerized emulsion was applied to primed polyethylene terephthalate (PET) substrate with a knife coating apparatus that had a gap of approximately 100 micrometers. The sample of coated wet polymerized emulsion was dried in a circulating air oven at a temperature of 65° C. for between 20 and 30 minutes and conditioned in the controlled environment room overnight before testing.

In some embodiments, or examples, the pressure sensitive adhesive was formed using a dose of no more than 5 kGy at a dose rate of between 0.0008 and 0.0015 kGy/sec.

In some embodiments, or examples, the shear strength of the pressure sensitive adhesive, when coated on a substrate, was at least 5000 minutes at room temperature using a 1 kg weight. In addition, in some embodiments, the pressure sensitive adhesive, when coated on a substrate, also had a peel adhesion of at least 20 N/dm.

In some embodiments, or examples, the peel adhesion of the pressure sensitive adhesive, when coated on a substrate, was at least 20 N./dm.

In some embodiments, or examples, the emulsion composition of the pressure sensitive adhesive has at least 40 wt. % solids.

Example 1

Effect of Crosslinker Concentration

The samples were made as described above in the general experimental method, except that the crosslinker trimethylolpropane triacrylate (TMPTA) was added as part of the premix in the amounts indicated in Table 1. The residence time in the gamma irradiator was about 4 hours to accumulate a dose of about 17 kGy. Each sample was measured for latex particle size, percent conversion, percent gel, peel adhesion, RT shear strength and pressure-sensitive adhesive thickness. The particle size was measured using the N-Coulter 4 Particle Analyzer, available from Coulter Corporation, Miami, Fla. The results are shown in Table 1.

TABLE 1

| | Crosslinker parts | Latex Particle Size nm | Conversion % | Gel % | Peel Adhesion N/dm | Shear min | PSA Thickness µm |
|---|---|---|---|---|---|---|---|
| 1-A | none | 154 | 94.1 | 97.5 | 33.1 | 7106 | 48 |
| 1-B | 0.025 | 161 | 100.0 | 98.5 | 30.9 | 10K+ | 48 |
| 1-C | 0.050 | 153 | 99.6 | 98.8 | 30.4 | 1040 | 51 |
| 1-D | 0.075 | 155 | 100.0 | 99.1 | 26.7 | 10K+ | 43 |
| 1-E | 0.10 | 158 | 99.7 | 99.1 | 28.5 | 10K+ | 51 |
| 1-F | 0.24 | 164 | 99.5 | 99.3 | 11.2 | 10K+ | 30 |
| 1-G | 0.50 | 165 | 100.0 | 99.6 | 6.8 | 10K+ | 43 |
| 1-H | 0.75 | 165 | 99.9 | 99.8 | 3.1 | 10K+ | 46 |
| 1-I | 1.00 | 172 | 99.3 | 99.8 | 2.2 | 10K+ | 38 |

As seen in the above table, high shear pressure-sensitive adhesives can be made with a wide range of peel adhesion. The peel adhesion from glass sharply decreased as the concentration of the crosslinker increased above 0.1, while the shear strength remained uniformly high. The static shear strength was almost always high (10 K+minutes), and the percent conversion and gel content were over 94 percent.

Example 2

Variation in Crosslinker Amount, Dose, and Temperature

The samples of Example 2 were made in the same manner as described in the general experimental method except that the weight percent solids of the polymerizable content of the emulsion was 40 percent, a crosslinker trimethylolpropane triacrylate was added as part of the premix in the amounts indicated in the Tables, and the dose was different as indicated in the Tables. In addition, some of the samples were placed in ice while polymerized to control temperature, as indicated in the Tables.

Each sample was measured for percent conversion, percent gel and peel adhesion. The results are shown in Table 2-A through 2-F. The shear for each of the samples was over 10,000 minutes except for Examples 2-M and 2-N which were 2546 (sp) and 91 (sp), respectively.

TABLE 2-A

Dose = 2.8 kGy, Exposure Time = 30 minutes,
Dose Rate = 0.0015 kGy/sec

| | Crosslinker parts | Conversion % | Gel % | Peel Adhesion N/dm | Temperature Control |
|---|---|---|---|---|---|
| 2-A-1 | 0 | 89.3 | 89.1 | 45.3 | none |
| 2-A-2 | 0.025 | 91.3 | — | 40.5 | none |
| 2-A-3 | 0.050 | 94.4 | 96.8 | 40.0 | none |
| 2-A-4 | 0.075 | 93.5 | — | 36.4 | none |
| 2-A-5 | 0.100 | 99.4 | — | 37.7 | none |
| 2-B-1 | 0 | 90.5 | 92.0 | 37.4 | ice |
| 2-B-2 | 0.025 | 93.1 | — | 36.8 | ice |
| 2-B-3 | 0.050 | 96.7 | 98.1 | 33.5 | ice |
| 2-B-4 | 0.075 | 95.4 | — | 32.4 | ice |
| 2-B-5 | 0.100 | 96.4 | — | 31.5 | ice |

TABLE 2-B

Dose = 4.4 kGy, Exposure Time = 60 minutes,
Dose Rate = 0.0012 kGy/sec

| | Crosslinker parts | Conversion % | Gel % | Peel Adhesion N/dm | Temperature Control |
|---|---|---|---|---|---|
| 2-C-1 | 0 | 90.6 | 93.8 | 40.5 | none |

TABLE 2-B-continued

Dose = 4.4 kGy, Exposure Time = 60 minutes,
Dose Rate = 0.0012 kGy/sec

| | Crosslinker parts | Conversion % | Gel % | Peel Adhesion N/dm | Temperature Control |
|---|---|---|---|---|---|
| 2-C-2 | 0.025 | 94.2 | — | 39.2 | none |
| 2-C-3 | 0.050 | 97.0 | 97.2 | 34.6 | none |
| 2-C-4 | 0.075 | 94.9 | — | 35.3 | none |
| 2-C-5 | 0.100 | 97.9 | — | 35.3 | none |
| 2-D-1 | 0 | 91.9 | 91.6 | 37.9 | ice |
| 2-D-2 | 0.025 | 94.4 | — | 35.9 | ice |
| 2-D-3 | 0.050 | 96.6 | 98.3 | 32.0 | ice |
| 2-D-4 | 0.075 | 97.3 | — | 25.0 | ice |
| 2-D-5 | 0.100 | 98.4 | — | 30.9 | ice |

TABLE 2-C

Dose = 6.7 kGy, Exposure Time = 90 minutes,
Dose Rate = 0.0012 kGy/sec

| | Crosslinker parts | Conversion % | Gel % | Peel Adhesion N/dm | Temperature Control |
|---|---|---|---|---|---|
| 2-E-1 | 0 | 90.3 | — | 35.7 | none |
| 2-E-2 | 0.025 | 95.9 | — | 38.5 | none |
| 2-E-3 | 0.050 | 97.7 | 96.5 | 38.5 | none |
| 2-E-4 | 0.075 | 95.9 | — | 32.4 | none |
| 2-E-5 | 0.100 | 97.5 | — | 32.4 | none |
| 2-F-1 | 0 | 92.2 | 95.1 | 37.4 | ice |
| 2-F-2 | 0.025 | 95.0 | — | 28.0 | ice |
| 2-F-3 | 0.050 | 98.8 | 98.7 | 27.4 | ice |
| 2-F-4 | 0.075 | 96.8 | — | 22.1 | ice |
| 2-F-5 | 0.100 | 98.6 | — | 27.8 | ice |

TABLE 2-D

Dose = 10.0 kGy, Exposure Time = 120 minutes,
Dose Rate = 0.0014 kGy/sec

| | Crosslinker parts | Conversion % | Gel % | Peel Adhesion N/dm | Temperature Control |
|---|---|---|---|---|---|
| 2-G-1 | 0 | 91.0 | 95.7 | 39.6 | none |
| 2-G-2 | 0.025 | 94.5 | — | 35.7 | none |
| 2-G-3 | 0.050 | 98.8 | 96.8 | 30.0 | none |
| 2-G-4 | 0.075 | 97.2 | — | 28.5 | none |
| 2-G-5 | 0.100 | 98.1 | — | 31.5 | none |
| 2-H-1 | 0 | 91.2 | 95.8 | 32.9 | ice |
| 2-H-2 | 0.025 | 94.3 | — | 25.4 | ice |
| 2-H-3 | 0.050 | 98.1 | 98.4 | 28.7 | ice |
| 2-H-4 | 0.075 | 96.5 | — | 26.3 | ice |
| 2-H-5 | 0.100 | 97.5 | — | 22.3 | ice |

TABLE 2-E

Dose = 13.0 kGy, Exposure Time = 180 minutes,
Dose Rate = 0.0012 kGy/sec

| | Crosslinker parts | Conversion % | Gel % | Peel Adhesion N/dm | Temperature Control |
|---|---|---|---|---|---|
| 2-I-1 | 0 | 92.3 | 96.6 | 37.4 | none |
| 2-I-2 | 0.025 | 95.6 | — | 33.9 | none |
| 2-I-3 | 0.050 | 99.8 | 98.2 | 30.0 | none |
| 2-I-4 | 0.075 | 98.5 | — | 29.4 | none |
| 2-I-5 | 0.100 | 98.9 | — | 30.9 | none |

TABLE 2-F

Dose = 13.5 kGy, Exposure Time = 180 minutes,
Dose Rate = 0.00125 kGy/sec

| | Crosslinker parts | Conversion % | Gel % | Peel Adhesion N/dm | Temperature Control |
|---|---|---|---|---|---|
| 2-J-1 | 0 | 93.0 | 97.2 | 34.6 | ice |
| 2-J-2 | 0.025 | 96.3 | — | 23.7 | ice |
| 2-J-3 | 0.050 | 98.7 | 99.3 | 29.8 | ice |
| 2-J-4 | 0.075 | 98.2 | — | 25.8 | ice |
| 2-J-5 | 0.100 | 98.3 | — | 25.0 | ice |

TABLE 2-G

Dose = 16.3 kGy, Exposure Time = 240 minutes,
Dose Rate = 0.0011 kGy/sec

| | Crosslinker parts | Conversion % | Gel % | Peel Adhesion N/dm | Temperature Control |
|---|---|---|---|---|---|
| 2-K-1 | 0 | 93.0 | 97.1 | 35.9 | none |
| 2-K-2 | 0.025 | 96.8 | — | 33.3 | none |
| 2-K-3 | 0.050 | 99.4 | 98.2 | 31.3 | none |
| 2-K-4 | 0.075 | 98.4 | — | 27.2 | none |
| 2-K-5 | 0.100 | 99.9 | — | 27.8 | none |

TABLE 2-H

Dose = 17.9 kGy, Exposure Time = 240 minutes,
Dose Rate = 0.0012 kGy/sec

| | Crosslinker parts | Conversion % | Gel % | Peel Adhesion N/dm | Temperature Control |
|---|---|---|---|---|---|
| 2-L-1 | 0 | 89.5 | 98.2 | 30.0 | ice |
| 2-L-2 | 0.025 | 94.9 | — | 29.1 | ice |
| 2-L-3 | 0.050 | 98.3 | 98.6 | 28.3 | ice |
| 2-L-4 | 0.075 | 96.6 | — | 22.6 | ice |
| 2-L-5 | 0.100 | 98.3 | — | 25.4 | ice |

TABLE 2-I

Dose = 3.1 kGy, Exposure Time = 70 minutes,
Dose Rate = 0.0007 kGy/sec

| | Crosslinker parts | Conversion % | Gel % | Peel Adhesion N/dm | Temperature Control |
|---|---|---|---|---|---|
| 2-M | 0 | — | — | 49.3 | none |
| 2-N[1] | 0 | — | — | 35.5 | none |
| 2-O[2] | 0 | — | — | — | none |

[1]Partially coagulated.
[2]Coagulated-unable to coat sample.

The effects of crosslinker level, dose, and temperature control on the polymerization and adhesive properties can be seen in the Tables. The primary effect of crosslinker, when introduced in small amounts, is to accelerate the polymerization to higher conversion. Increasing levels of crosslinker to speed up the conversion typically lowers the peel adhesion. In this series of experiments, there appears to be little advantage to increasing the dose beyond about 2 to about 3 kGy. An increase in dose generally involves longer residence times and the peel adhesion appears to decrease slightly. The percent conversion and gel content ranged from about 90 to 98%.

The data in the Tables also shows the effect of polymerizing temperature on the properties of the resulting pressure sensitive adhesive. Lower temperature slightly increased conversion and slightly lowered the gel percentage, suggesting that a higher molecular weight was achieved. This, in turn, resulted in slightly lower peel adhesion values. It does not appear that temperature is a major factor in this polymerization and does not couple advantageously with level of crosslinker or dose.

Example 3

Effect of Low Dose Level

The samples of Example 3 were made in the same manner as described in the general experimental method except that a crosslinker trimethylolpropane triacrylate was added as part of the premix in the amounts indicated in the Tables and the dose was different as indicated in the Tables. In addition, some of the samples were placed in ice to control temperature, as indicated in the Tables. Each sample was measured for percent conversion, peel adhesion and RT shear strength. The results are shown in Table 3-A through 3-E

TABLE 3-A

Dose = 0.56 kGy, Exposure Time = 12 minutes, Dose Rate = 0.0008 kGy/sec

|  | Crosslinker parts | Conversion % | Peel Adhesion N/dm | Shear Strength min | Temperature Control |
|---|---|---|---|---|---|
| 3-A-1 | 0 | 0.6 | — | — | none |
| 3-A-2 | 0.025 | 0.6 | — | — | none |
| 3-A-3 | 0.050 | 86.9 | — | — | none |
| 3-A-4 | 0.075 | 85.0 | 35.5 | 10K+ | none |
| 3-A-5 | 0.100 | 87.1 | 41.4 | 10K+ | none |

TABLE 3-B

Dose = 0.62 kGy, Exposure Time = 12 minutes, Dose Rate = 0.0009 kGy/sec

|  | Crosslinker parts | Conversion % | Peel Adhesion N/dm | Shear Strength min | Temperature Control |
|---|---|---|---|---|---|
| 3-B-1 | 0 | 0.7 | — | — | ice |
| 3-B-2 | 0.025 | 71.6 | — | — | ice |
| 3-B-3 | 0.050 | 90.2 | 37.7 | 10K+ | ice |
| 3-B-4[1] | 0.075 | 100.0 | — | — | ice |
| 3-B-5 | 0.100 | 84.7 | 38.8 | 10K+ | ice |

1: Coagulated-unable to coat adhesive with knife coater.

TABLE 3-C

Dose = 1.1 kGy, Exposure Time = 24 minutes, Dose Rate = 0.0008 kGy/sec

|  | Crosslinker parts | Conversion % | Peel Adhesion N/dm | Shear Strength min | Temperature Control |
|---|---|---|---|---|---|
| 3-C-1 | 0 | 57.9 | — | — | none |
| 3-C-2 | 0.025 | 57.0 | — | — | none |
| 3-C-3 | 0.050 | 94.4 | 38.8 | 10K+ | none |
| 3-C-4 | 0.075 | 96.7 | 27.6 | 10K+ | none |
| 3-C-5 | 0.100 | 95.1 | 33.1 | 10K+ | none |

TABLE 3-D

Dose = 1.5 kGy, Exposure Time = 24 minutes, Dose Rate = 0.0010 kGy/sec

|  | Crosslinker parts | Conversion % | Peel Adhesion N/dm | Shear Strength min | Temperature Control |
|---|---|---|---|---|---|
| 3-D-1 | 0 | 69.4 | — | — | ice |
| 3-D-2 | 0.025 | 95.0 | 28.3 | 10K+ | ice |
| 3-D-3 | 0.050 | 92.0 | 38.3 | 10K+ | ice |
| 3-D-4 | 0.075 | 95.2 | 34.6 | 10K+ | ice |
| 3-D-5 | 0.100 | 94.4 | 30.0 | 10K+ | ice |

TABLE 3-E

Dose = 2.2 kGy, Exposure Time = 36 minutes, Dose Rate = 0.0010 kGy/sec

|  | Crosslinker parts | Conversion % | Peel Adhesion N/dm | Shear Strength min | Temperature Control |
|---|---|---|---|---|---|
| 3-E-1 | 0 | 97.6 | 45.1 | 10K+ | none |
| 3-E-2 | 0.025 | 84.6 | 42.7 | 10K+ | none |
| 3-E-3 | 0.050 | 99.8 | 33.9 | 10K+ | none |
| 3-E-4 | 0.075 | 93.9 | 33.5 | 10K+ | none |
| 3-E-5 | 0.100 | 96.5 | 27.6 | 10K+ | none |

As seen in the Tables, high shear strength emulsion-polymerized acrylate pressure-sensitive adhesives with high peel adhesion to glass were made at gamma irradiation dose levels as low as 0.56 kGy. As lower dose levels were used, the concentration of crosslinker had a more pronounced effect on conversion percentage.

Example 4 and Comparative Example 4

Variation of Amount of Polar, Free-radically Copolymerizable Material

The samples of Example 4 were made in the same manner as described in the general experimental method except that the weight percent solids of the total free-radically polymerizable material of the emulsion was 40 percent, no crosslinker was added, and the ratio of iso-octyl acrylate monomer to acrylic acid was varied, as indicated in Table 4. The dose was 3.1 kGy, the residence time was 70 minutes, and the dose rate was 0.0007 kGy/second.

Comparative Example 4 (CE-4) is the same as the other samples of Example 4 except no acrylic acid was added.

Each sample was measured for percent gel, latex particle size, peel adhesion and RT shear strength. The results are shown in Table 4.

TABLE 4

|  | Wt. % Ratio of iso-octyl acrylate: acrylic acid | Gel % | Latex Particle Size nm | Peel Adhesion N/dm | Shear min |
|---|---|---|---|---|---|
| 4-A | 99:1 | 56.8 | 159 | 41.8 | 19 sp |
| 4-B | 98:2 | 81.2 | 158 | 39.2 | 10K+ |
| 4-C | 97:3 | 88.1 | 142 | 29.8 | 10K+ |
| 4-D | 95:5 | 93.5 | 183 | 25.4 | 10K+ |
| 4-E | 94:6 | 96.5 | 229 | 26.1 | 10K+ |
| 4-F[1] | 93:7 | — | — | — | — |
| CE-4 | 100:0 | 57.8 | 164 | 20.6 | 1 sp |

[1]Coagulated unable to coat adhesive with knife coater.

As seen in Table 4, the use of relatively small amounts of the polar, free-radically copolymerizable material acrylic acid dramatically increased the shear strength and gel content, as compared to CE-4, of the resulting pressure sensitive adhesive without substantially decreasing its peel adhesion.

Example 5

Variation of Amount and Type of Emulsifier

The samples of Example 5 were made in the same manner as described in the general experimental method except that the weight percent solids of the polymerizable content of the emulsion was 40 percent and the amount of the emulsifier SIPONIC DS-10 was varied as indicated in Table 5-A. The dose was 3.2 kGy, the residence time was 70 minutes, and the dose rate was 0.0008 kGy/second. The samples were tested for latex particle size, gel percent, peel adhesion and RT shear strength. Results are reported in Table 5-A.

TABLE 5-A

|  | Emulsifier parts | Latex Particle Size nm | Gel % | Peel Adhesion N/dm | Shear min |
| --- | --- | --- | --- | --- | --- |
| 5-A-1 | 0.2 | 290 | 91.8 | 22.1 | 10K+ |
| 5-A-2 | 0.3 | 254 | 92.6 | 28.7 | 10K+ |
| 5-A-3 | 0.4 | 185 | 92.1 | 33.1 | 10K+ |
| 5-A-4 | 0.6 | 171 | 92.6 | 34.8 | 10K+ |
| 5-A-5 | 0.7 | 162 | 93.8 | 35.0 | 10K+ |
| 5-A-6 | 1.0 | 160 | 90.8 | 32.2 | 10K+ |

Sample 5-B was made in a manner similar to Sample 5-A-1 except the emulsifier STANDAPOL A was used at about 0.5 parts. Sample 5-C was made in a manner similar to Sample 5-A-1 except the emulsifier HS-10 was used at about 0.5 parts. Sample 5-D was made in a manner similar to Sample 5-A-1 except the emulsifier MAZONTM SAM-211-80 was used at about 0.5 parts. Dried coating thickness ranged between 25 and 38 microns.

The samples were tested for peel adhesion and RT shear strength. Results are reported in Table 5-B.

TABLE 5-B

|  | Type of Emulsifier | Peel Adhesion N/dm | Shear min |
| --- | --- | --- | --- |
| 5-B | Standapol A | 6.8 | 10K+ |
| 5-C | HS-10 | 12.5 | 10K+ |
| 5-D | Mazon Sam-211-80 | 41.8 | 9097 sp |

As seen in Tables 5-A and 5-B, both type and amount of emulsifier can affect properties of gamma-polymerized pressure-sensitive adhesives. Like pressure-sensitive adhesives made with thermal processes, increased amounts of emulsifier resulted in decreased particle size. In addition, peel adhesion appears to generally increase with increased amounts of emulsifier (at least up to 0.7 parts).

Example 6

Variation of Amount and Type of Crosslinker and Chain Transfer Agent

The samples in Table 6-A were made in the same manner as described in the general experimental method except that the weight percent solids of the polymerizable content of the emulsion was 40 percent and the amount of the crosslinker trimethylolpropane triacrylate was varied as indicated in Table 6-A. The dose was 2.2 kGy, the residence time was 36 minutes and the dose rate was 0.0010 kGy/second. The samples were tested for percent conversion, peel adhesion and RT shear strength. The results are shown in Table 6-A.

TABLE 6-A

Variation in Amount of Crosslinker

|  | Crosslinker parts | Conv % | Peel Adhesion N/dm | Shear min |
| --- | --- | --- | --- | --- |
| 6-A-1 | none | 97.6 | 45.1 | 10K+ |
| 6-A-2 | 0.025 | 84.6 | 42.7 | 10K+ |
| 6-A-3 | 0.05 | 99.8 | 33.9 | 10K+ |
| 6-A-4 | 0.075 | 93.9 | 33.5 | 10K+ |
| 6-A-5 | 0.1 | 96.5 | 27.6 | 10K+ |

The samples in Table 6-B were made in the same manner as described earlier in the general experimental method except that the weight percent solids of the polymerizable content of the emulsion was 40 percent and the amount of the crosslinker pentaerythritol tetraacrylate was varied as indicated in Table 6-B. The dose was 2.2 kGy, the residence time was 36 minutes and the dose rate was 0.0010 kGy/second. The samples were tested for percent conversion, peel adhesion and RT shear strength. The results are shown in Table 6-B.

TABLE 6-B

Use of Pentaerythritol Tetraacrylate as Crosslinker

|  | Crosslinker parts | Conv % | Peel Adhesion N/dm | Shear min |
| --- | --- | --- | --- | --- |
| 6-B-1 | 0.05 | 95.6 | 49.3 | 94 |
| 6-B-2 | 0.1 | 96.0 | 48.2 | 10K+ |
| 6-B-3 | 0.2 | 92.9 | 32.4 | 10K+ |
| 6-B-4 | 0.4 | 95.6 | 12.5 | 10K+ |
| 6-B-5 | 0.6 | 87.7 | 10.1 | 10K+ |

The samples in Table 6-C were made in the same manner as described earlier in the general experimental method except that the weight percent solids of the polymerizable content of the emulsion was 40 percent and the amount of the chain transfer agent n-dodecylmercaptan was varied as indicated in Table 6-C. No crosslinker was used in these experiments. The dose was 2.2 kGy, the residence time was 36 minutes and the dose rate was 0.0010 kGy/second. The samples were tested for percent conversion, peel 10 adhesion and RT shear strength. The results are shown in Table 6-C.

TABLE 6-C

Use of Chain Transfer Agent

|  | Chain Transfer Agent parts | Conv % | Peel Adhesion N/dm | Shear min |
| --- | --- | --- | --- | --- |
| 6-C-1 | 0.05 | 96.6 | 53.4 | 277 |
| 6-C-2 | 0.1 | 98.0 | 57.8 | 14 |
| 6-C-3 | 0.2 | 96.7 | 60.0 | 4 sp |
| 6-C-4 | 0.4 | 99.1 | 103.1t | 0 sp |
| 6-C-5 | 0.6 | 98.7 | 76.0t | 0 sp |

The samples in Table 6-D were made in the general experimental method except that the weight percent solids of the polymerizable content of the emulsion was 40 percent and the amount of the crosslinker trimethylolpropane triacrylate and the chain transfer agent n-dodecylmercaptan was varied as indicated in Table 6-D. The dose was 3.7 kGy, the residence time was 40 minutes and the dose rate was 0.0015 kGy/second. The samples were tested for percent conversion, peel adhesion and RT shear strength. The results are shown in Table 6-D.

TABLE 6-D

Use of Crosslinker and Chain Transfer Agent

|  | Crosslinker parts | Chain Transfer Agent parts | Conv % | Peel Adhesion N/dm | Shear min |
|---|---|---|---|---|---|
| 6-D-1 | none | none | 97.3 | 44.2 | 10 K+ |
| 6-D-2 | 0.025 | 0.05 | 92.1 | 57.4 | 10 K+ |
| 6-D-3 | 0.025 | 0.1 | 96.5 | 52.1 | 43 r |
| 6-D-4 | 0.025 | 0.2 | 96.4 | 53.4 | 18 sp |
| 6-D-5 | 0.025 | 0.4 | 97.6 | 103 t | 0 sp |
| 6-D-6 | 0.025 | 0.6 | 98.3 | 76.7 t | 0 sp |

The samples in Table 6-E were made in the same manner as described in the general experimental method except that the weight percent solids of the polymerizable content of the emulsion was 40 percent and the amount of the crosslinker trimethylolpropane triacrylate and the chain transfer agent n-dodecylmercaptan was varied as indicated in Table 6-E. The dose was 4.4 kGy, the residence time was 72 minutes and the dose rate was 0.0010 kGy/second. The samples were tested for peel adhesion and RT shear strength. The results are shown in Table 6-E.

TABLE 6-E

Use of Crosslinker and Chain Transfer Agent

|  | Crosslinker parts | Chain Transfer Agent parts | Peel Adhesion N/dm | Shear min |
|---|---|---|---|---|
| 6-E-1 | 0.05 | 0.006 | 42.7 | 19 r |
| 6-E-2 | 0.05 | 0.012 | 36.8 | 136 r |
| 6-E-3 | 0.4 | 0.025 | 91.1 | 2 sp |
| 6-E-4 | 0.4 | 0.05 | 70.1t | 0 sp |
| 6-E-5 | 0.4 | 0.075 | 33.9 | 6 sp |
| 6-E-6 | 0.4 | 0.1 | 55.4 | 8 r |

As seen in the Tables, different peel adhesion and shear properties can be obtained with different crosslinkers. The presence of chain transfer agent generally resulted in an increase in peel strength but a decrease in shear strength apparently by decreasing polymer network formation. However, surprisingly, high peel adhesion and high shear strength properties were observed when small amounts of both crosslinker and chain transfer agent were used. A high shear-strength pressure-sensitive adhesive with a peel adhesion of 57.4 N/dm was obtained.

Example 7

Use of Tackifying Agent

The samples in Table 7 were made in the same manner as described in the general experimental method except that the weight percent solids of the polymerizable content of the emulsion was 40 percent and a tackifying agent was added (except for the first sample) of the type and amount indicated in Table 7. The dose was 2.7 kGy, the residence time was 60 minutes and the dose rate was 0.0008 kGy/second. The samples were tested for peel adhesion and RT shear strength. The results are shown in Table 7.

TABLE 7

|  | Tackifier type | parts | Peel Adhesion N/dm | Shear min |
|---|---|---|---|---|
| 7-A | none | none | 25.2 | 10K+ |
| 7-B-1 | FORAL ™ 85 | 1 | 28.7 | 10K+ |
| 7-B-2 | FORAL ™ 85 | 7 | 40.7 | 5808 sp |
| 7-B-3 | FORAL ™ 85 | 10 | 47.7 | 1872 sp |
| 7-C-1 | WINGTACK ™ PLUS | 1 | 30.9 | 10K+ |
| 7-C-2 | WINGTACK ™ PLUS | 7 | 32.0 | 10K+ |
| 7-C-3 | WINGTACK ™ PLUS | 10 | 34.6 | 10K+ |
| 7-D | ARKON ™ P-90 | 7 | 32.0 | 10K+ |
| 7-E | PICCOLYTE ™ S-115 | 7 | 27.8 | 10K+ |
| 7-F | ESCOREZ ™ 1310 | 7 | 33.7 | 10K+ |

As seen in Table 7, some tackifiers increased peel adhesion of the pressure-sensitive adhesives more than others. Of those tested, FORAL 85 resulted in the most increase in peel adhesion, but with a corresponding decrease in shear strength.

Example 8

Use of a Second (Meth)Acrylate Monomer

The samples in Table 8-A were made in the same manner as described in the general experimental method except that the weight percent solids of the polymerizable content of the emulsion was 40 percent and a second (meth)acrylate monomer, n-butyl acrylate, was used in the amounts indicated in Table 8-A. Each composition also included 4 parts acrylic acid. The dose was about 1.8 kGy, the residence time was 20 minutes and the dose rate was about 0.0015 kGy/second. Two trials were run. The samples were tested for percent conversion, peel adhesion and RT and 70° C. shear strength. The results are shown in Table 8-A.

TABLE 8-A

|  | iso-octyl acrylate parts | n-butyl acrylate parts | acrylic acid parts | Peel Adhesion N/dm | Shear (RT) min | Shear (70° C.) min | Conversion Percent Trial 1 | Trial 2 |
|---|---|---|---|---|---|---|---|---|
| 8-A-1 | 96 | 0 | 4 | 39.0 | 10K+ | 10K+ | 91.3 | 92.3 |
| 8-B-1 | 94 | 2 | 4 | 37.2 | 10K+ | 10K+ | 92.2 | 93.5 |
| 8-C-1 | 91 | 5 | 4 | 42.5 | 10K+ | 10K+ | 90.0 | 91.7 |
| 8-D-1 | 86 | 10 | 4 | 48.6 | 10K+ | 10K+ | 90.8 | 91.2 |
| 8-E-1 | 81 | 15 | 4 | 37.0 | 10K+ | 1466, 5630sp | 92.4 | 91.8 |

TABLE 8-A-continued

| | iso-octyl acrylate | n-butyl acrylate | acrylic acid | Peel Adhesion | Shear (RT) | Shear (70° C.) | Conversion Percent | |
|---|---|---|---|---|---|---|---|---|
| | parts | parts | parts | N/dm | min | min | Trial 1 | Trial 2 |
| 8-F-1 | 76 | 20 | 4 | 30.0 | 10K+ | 1110sp 10K+ | 86.3 | 79.7 |

The samples in Table 8-B were made in the same manner as described earlier in the general experimental method except that the weight percent solids of the polymerizable content of the emulsion was 40 percent and a second (meth)acrylate monomer, n-butyl acrylate, was used in the amounts indicated in Table 8-B. Each composition also included four parts acrylic acid. The dose was about 3.7 kGy, the residence time was 40 minutes and the dose rate was about 0.0015 kGy/second. Two trials were run. The samples were tested for percent conversion, peel adhesion and RT and 70° C. shear strength. The results are shown in Table 8-B.

TABLE 8-B

| | iso-octyl acrylate | n-butyl acrylate | acrylic acid | Peel Adhesion | Shear (RT) | Shear (70° C.) | Conversion Percent | |
|---|---|---|---|---|---|---|---|---|
| | parts | parts | parts | N/dm | min | min | Trial 1 | Trial 2 |
| 8-A-2 | 96 | 0 | 4 | 37.7 | 10K+ | 10K+ | 94.8 | 96.0 |
| 8-B-2 | 94 | 2 | 4 | 41.6 | 10K+ | 10K+ | 95.0 | 94.2 |
| 8-C-2 | 91 | 5 | 4 | 46.0 | 10K+ | 10K+ | 93.6 | 94.2 |
| 8-D-2 | 86 | 10 | 4 | 42.5 | 10K+ | 10K+ | 95.7 | 95.9 |
| 8-E-2 | 81 | 15 | 4 | 46.0 | 7659, 7651sp | 4806, 7655sp | 79.0 | 96.4 |
| 8-F-2 | 76 | 20 | 4 | 42.0 | 6304, 7040sp | 2323, 6222sp | 94.9 | 95.2 |

The addition of the second (meth)acrylate monomer generally increased peel adhesion. Amounts of 15 parts or greater of the second (meth)acrylate monomer appear to have adverse effects on shear.

Comparative Example 9

Absence of Polar, Free-Radically Copolymerizable Material

The samples in Comparative Example 9 were made in the same manner as described in the general experimental method except that the polymerizable material was selected from combinations of 2-ethylhexylmethacrylate and iso-octyl acrylate and the weight percent solids of the polymerizable content of the emulsion was 40 percent. No polar, free-radically copolymerizable material was used. For the samples in Table 9-A, the dose was about 3.7 kGy, the residence time was 40 minutes and the dose rate was about 0.0015 kGy/second. The samples were tested for percent conversion, but not for peel adhesion and RT shear strength because of the low conversion percentages. The results are reported in Table 9-A.

TABLE 9-A

| | 2-ethylhexyl methacrylate parts | Iso-octyl acrylate parts | Conversion % |
|---|---|---|---|
| CE9-A1 | 100 | 0 | 20.4 |
| CE9-B1 | 50 | 50 | 20.9 |
| CA9-C1 | 35 | 65 | 6.1 |
| CA9-D1 | 30 | 70 | 11.6 |

TABLE 9-A-continued

| | 2-ethylhexyl methacrylate parts | Iso-octyl acrylate parts | Conversion % |
|---|---|---|---|
| CA9-E1 | 25 | 75 | 14.2 |
| CA9-F1 | 20 | 80 | 11.9 |

For the samples in Table 9-B, the dose was about 5.2 kGy, the residence time was 60 minutes and the dose rate was about 0.0015 kGy/second. The samples were tested for 5 percent conversion, peel adhesion, and RT and 70° C. shear strength. The results are reported in Table 9-B.

TABLE 9-B

| | 2-ethylhexyl methacrylate parts | n-octyl acrylate parts | Conversion % | Peel Adhesion N/dm | Shear (RT) min | Shear (70° C.) min |
|---|---|---|---|---|---|---|
| CE9-A2 | 100 | 0 | 97.8 | not tacky | 0, 0 sp | 0, 0 sp |
| CE9-B2 | 50 | 50 | 88.0 | 9.2 sh | 1, 2 sp | 0, 0 sp |
| CA9-C2 | 35 | 65 | 95.9 | 24.5 | 1, 1 sp | 0, 0 sp |
| CA9-D2 | 30 | 70 | 79.4 | 24.3 | 1, 1 sp | 0, 0 sp |
| CA9-E2 | 25 | 75 | 90.5 | 16.0 | 0, 1 sp | 0, 0 sp |
| CA9-F2 | 20 | 80 | 91.8 | 11.8 | 1, 1 sp | 0, 0 sp |

These polymerized materials had essentially no shear strength and, thus, would be unsuitable for many applications.

Example 10

Additional Examples of Pressure Sensitive Adhesives

The samples in Example 10 were made in the same manner as described in the general experimental method except that the weight percent solids of the polymerizable content of the emulsion was 40 percent, the (meth)acrylate monomer material contained n-octyl acrylate and another copolymerizable monomer material, 2-ethylhexyl methacrylates, in the amounts indicated in the Tables. In addition, four parts acrylic acid was included in the emulsion. The dose is indicated in the heading of each of the Tables. Each sample was tested for percent conversion, peel adhesion and shear strength. The results are reported in Table 10-A through 10-C.

TABLE 10-A

Dose = 2.4 kGy, Dose rate = 0.0020 kGy/sec, and Residence Time = 20 min

|  | n-octyl acrylate parts | 2-ethylhexyl methacrylate parts | acrylic acid parts | Conv % | Peel N/dm | Shear min | Coating Thickness µm |
|---|---|---|---|---|---|---|---|
| 10-A-1 | 50 | 46 | 4 | 40.0 | — | — | — |
| 10-B-1 | 65 | 31 | 4 | 24.3 | — | — | — |
| 10-C-1 | 70 | 26 | 4 | 97.3 | 30.4 | 6600, 7179 | 20 |
| 10-D-1 | 75 | 21 | 4 | 59.0 | 30.4 | 53, 53 sp | 10 |
| 10-E-1 | 80 | 16 | 4 | 92.9 | 22.8 | 53, 1193 sp | 20 |

TABLE 10-B

Dose = 4.3 kGy, Dose rate = 0.0018 kGy/sec, and Residence Time = 40 min

|  | n-octyl acrylate parts | 2-ethylhexyl methacrylate parts | acrylic acid parts | Conv % | Peel N/dm | Shear min | Coating Thickness µm |
|---|---|---|---|---|---|---|---|
| 10-A-2 | 50 | 46 | 4 | 96.4 | 33.3 | 10K+ | 13 |
| 10-B-2 | 65 | 31 | 4 | 96.5 | 18.4 | 13, 542 | 23 |
| 10-C-2 | 70 | 26 | 4 | 92.3 | 23.9 | 10K+ | 25 |
| 10-D-2 | 75 | 21 | 4 | 98.9 | 28.1 | 77, 10 K+ | 23 |
| 10-E-2 | 80 | 16 | 4 | 93.9 | 26.0 | 100, 10K | 20 |

TABLE 10-C

Dose = 6.4 kGy, Dose rate = 0.0018 kGy/sec, and Residence Time = 60 min

|  | n-octyl acrylate parts | 2-ethylhexyl methacrylate parts | acrylic acid parts | Conv % | Peel N/dm | Shear min | Coating Thickness µm |
|---|---|---|---|---|---|---|---|
| 10-A-3 | 50 | 46 | 4 | 95.2 | 23.4 | 10K+ | 23 |
| 10-B-3 | 65 | 31 | 4 | 93.8 | 18.4 | 3, 1597 | 25 |
| 10-C-3 | 70 | 26 | 4 | 64.5 | 24.3 | 27, 140 | 36 |
| 10-D-3 | 75 | 21 | 4 | 96.6 | 30.2 | 18 sp, 10K+ | 20 |
| 10-E-3 | 80 | 16 | 4 | 92.1 | 31.7 | 2868, 10K+ | 48 |

As seen in the Tables, a polymerizable polar material added to a system similar to Comparative Example 9 results in a pressure-sensitive adhesive that has higher shear properties.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. An article comprising:
   a polymeric reaction product formed by gamma ray irradiation of an emulsion composition comprising:
   water;
   (meth)acrylate monomer material;
   polar, free-radically polymerizable material that is copolymerizable with the (meth)acrylate monomer material; and
   at least one emulsifier;
   wherein said polymeric reaction product is a pressure sensitive adhesive.

2. The article of claim 1, wherein the polar, free-radically polymerizable material is selected from the group consisting of acrylic acid and methacrylic acid.

3. The article of claim 1, wherein the (meth)acrylate monomer material comprises at least two different (meth)acrylate monomers.

4. The article of claim 1, wherein the emulsion composition further comprises a crosslinking agent.

5. An article comprising:
   a polymeric reaction product formed by gamma ray irradiation of an emulsion composition comprising:
   water;
   (meth)acrylate monomer material;
   polar, free-radically polymerizable material that is copolymerizable with the (meth)acrylate monomer material;
   at least one emulsifier;
   a crosslinking agent; and
   a chain transfer agent.

6. The article of claim 1, wherein the emulsion composition further comprises at least one copolymerizable material.

7. The article of claim 6, wherein the copolymerizable material comprises at least one prepolymerized material.

8. The article of claim 7, wherein the prepolymerized material is a prepolymerized (meth)acrylate monomer.

9. The article of claim 1, wherein the polymeric reaction product is formed in the absence of any substantial amount of initiator selected from the group consisting of photoinitiators and thermal initiators.

10. An article comprising:
    a polymeric reaction product formed by gamma ray irradiation -of an emulsion composition comprising:
    water;
    (meth)acrylate monomer material;
    polar, free-radically polymerizable material that is copolymerizable with the (meth)acrylate monomer material; and
    at least one emulsifier; and
    wherein said polymeric reaction product is formed using a dose of no more than 5 kGy at a dose rate of between 0.0008 and 0.0015 kGy/sec.

11. The article of claim 1, wherein the emulsion composition further comprises a tackifying agent.

12. The article of claim 1, wherein the pressure sensitive adhesive, when coated on a substrate, has a shear strength of at least 5000 minutes at room temperature using a 1 kg weight.

13. The article of claim 12, wherein the pressure sensitive adhesive, when coated on a substrate, has a peel adhesion of at least 20 N/dm.

14. The article of claim 1, wherein the pressure sensitive adhesive, when coated on a substrate, has a peel adhesion of at least 20 N/dm.

15. The article of claim 1, wherein the emulsion composition has at least 40 wt. % solids.

16. A pressure sensitive adhesive-forming emulsion composition comprising:
    a polymeric reaction product formed by gamma irradiation of a composition comprising:
    water;
    (meth)acrylate monomer material;
    polar, free-radically polymerizable material that is copolymerizable with the (meth)acrylate monomer material; and
    at least one emulsifier;
    wherein said polymeric reaction product is a pressure sensitive adhesive.

17. A method of making a pressure sensitive adhesive, the method comprising steps of:
    forming an emulsion composition comprising water, (meth)acrylate monomer material, polar, free-radically polymerizable material that is copolymerizable with the (meth)acrylate monomer material, and at least one emulsifier; and
    irradiating at least a portion of the emulsion composition with gamma rays to initiate polymerization of the emulsion composition.

18. The method of claim 17 further comprising the step of removing at least a portion of the water from the emulsion composition after irradiating at least a portion of the emulsion composition.

19. The method of claim 17 wherein the step of irradiating at least a portion of the emulsion composition comprises irradiating the emulsion composition substantially uniformly.

20. A method of making a pressure sensitive adhesive, the method comprising the steps of:
    forming an emulsion composition comprising water, (meth)acrylate monomer material, polar, free-radically polymerizable material that is copolymerizable with the (meth)acrylate monomer material, and at least one emulsifier; and
    irradiating at least a portion of the emulsion composition with gamma rays to initiate polymerization of the emulsion composition;
    wherein a container holding the emulsion composition is placed proximate a gamma ray source and irradiated, and then rotated 180 degrees, placed proximate the gamma ray source and irradiated again.

21. An article, comprising:
    a substrate; and
    a pressure sensitive adhesive disposed on at least one surface of the substrate, the pressure sensitive adhesive comprising a polymeric reaction product formed by gamma ray irradiation of an emulsion composition comprising:
    water;
    (meth)acrylate monomer material;
    polar, free-radically polymerizable material that is copolymerizable with the (meth)acrylate monomer material; and
    at least one emulsifier.

22. An article comprising:
a polymeric reaction product formed by gamma irradiation of an emulsion composition comprising:
   water;
   (meth)acrylate monomer material;
   polar, free-radically polymerizable material that is copolymerizable with the (meth)acrylate monomer material; and
   a least one emulsifier;
wherein the polymeric reaction product is a pressure sensitive adhesive and has a shear strength of at least 5000 minutes at, at least room temperature using a 1 kg weight and a peel adhesion of at least 45 N/dm at, at least room temperature.

23. The article of claim 22, wherein the shear strength of the polymeric reaction product is at least 10,000 minutes.

24. The article of claim 22, wherein the peel adhesion of the polymeric reaction product is at least 50 N/dm.

25. The article of claim 24, wherein the shear strength of the polymeric reaction product is at least 10,000 minutes.

* * * * *

UNITED STATES PATENT AND TRADEMARK OFFICE
CERTIFICATE OF CORRECTION

PATENT NO. : 6,461,728 B2
DATED : October 8, 2002
INVENTOR(S) : Weiss, Douglas E.

It is certified that error appears in the above-identified patent and that said Letters Patent is hereby corrected as shown below:

<u>Column 4,</u>
Lines 22 and 27, insert -- . -- following "thereof".

<u>Column 5,</u>
Line 36, insert -- . -- following "thereof".

<u>Column 8,</u>
Line 2, insert -- . -- following "thereof".

Signed and Sealed this

Eighteenth Day of March, 2003

JAMES E. ROGAN
*Director of the United States Patent and Trademark Office*